US 6,668,452 B2

(12) United States Patent
Adrian et al.

(10) Patent No.: US 6,668,452 B2
(45) Date of Patent: Dec. 30, 2003

(54) PISTON-ROD SCRAPING RING ACCOMMODATED IN A GROOVE IN A DASHPOT CAP, AND METHOD OF INSERTING SUCH A RING IN SUCH A GROOVE

(75) Inventors: Adolf Adrian, Ennepetal (DE); Andreas Nevoigt, Hagen (DE)

(73) Assignee: Krupp Bilstein GmbH, Ennepetal (DE)

(*) Notice: Subject to any disclaimer, the term of this patent is extended or adjusted under 35 U.S.C. 154(b) by 0 days.

(21) Appl. No.: 10/175,240

(22) Filed: Jun. 18, 2002

(65) Prior Publication Data
US 2003/0001342 A1 Jan. 2, 2003

(30) Foreign Application Priority Data
Jun. 20, 2001 (DE) .......................... 101 29 734

(51) Int. Cl.[7] ................................................ B23P 15/00
(52) U.S. Cl. ....................... 29/888.044; 29/888.042; 29/888.3; 29/509
(58) Field of Search ................ 29/888.044, 888.042, 29/888.3, 509, 520; 277/436

(56) References Cited

U.S. PATENT DOCUMENTS

| | | | | |
|---|---|---|---|---|
| 1,811,012 A | * | 6/1931 | Hodge ................... | 29/888.044 |
| 3,806,137 A | * | 4/1974 | Prasse et al. ............. | 277/138 |
| 3,921,988 A | * | 11/1975 | Prasse et al. ............. | 277/168 |
| RE31,005 E | * | 8/1982 | Prasse et al. ............. | 277/138 |
| 5,133,563 A | * | 7/1992 | Casellato ................. | 277/168 |
| 5,303,465 A | * | 4/1994 | Fujimoto ............... | 29/888.044 |
| 5,430,938 A | * | 7/1995 | Rao et al. .............. | 29/888.044 |
| 5,588,208 A | * | 12/1996 | Sato et al. ............. | 29/888.044 |
| 5,592,740 A | * | 1/1997 | Liechty et al. ......... | 29/888.044 |
| 6,206,379 B1 | * | 3/2001 | Toshiaki ................. | 277/436 |

* cited by examiner

Primary Examiner—I Cuda Rosenbaum
(74) Attorney, Agent, or Firm—Max Fogiel

(57) ABSTRACT

A piston-rod scraping ring (7) of elastic material accommodated in an inward opening groove (9) in a dashpot cap (2) and especially intended to scrape water and dirt off a piston rod (1). The object is to allow the ring to be easily inserted into the groove and secured there until the overall dashpot is assembled. The groove is accordingly higher at its outer circumference and its inner circumference (12) is deformed, compressing the rim (8) in place.

3 Claims, 3 Drawing Sheets

PISTON-ROD SCRAPING RING ACCOMMODATED IN A GROOVE IN A DASHPOT CAP, AND METHOD OF INSERTING SUCH A RING IN SUCH A GROOVE

BACKGROUND OF THE INVENTION

The present invention concerns, first, a piston-rod scraping ring accommodated in a groove in a dashpot cap and, second, a method of inserting such a ring in such a groove.

Piston-rod scraping rings of elastic materials, especially intended for scraping water and dirt off piston rods, and accommodated in a groove in a dashpot cap are known from German 3 443 370 C2.

There are many ways of securing such piston-rod scraping rings to the upper cap of a dashpot. One way is disclosed in German 3 443 370 C2. The cap is secured by means of a groove that is open radially and, in one direction, axially, by a sleeve that axially and radially encloses the rim around the ring and is forced into a bore in the groove. The compression secures the sleeve and hence the ring. There is a drawback to this approach in that the sleeve necessitates additional material and work.

Another approach to attaching such a cap to a dashpot is known from German Patent 1 140 705. The piston-rod scraping ring is again inserted in a groove that is open radially and, in one direction, axially, and secured there radially by compression at the end of the outer cylinder. One drawback to this approach is that the ring remains loose and can accordingly get lost before it is finally secured in place. Furthermore, to protect it from deformation or eccentricity, the cap must be inserted very precisely in the groove before the dashpot is assembled.

German 19 921 696 A1 discloses a seal accommodated in an inward-opening groove in a cap. The actual sealing mass employed in such seals must be well inserted axially in the groove. Furthermore, the mass must be secured in the nut somehow or radially tensioned, making the groove difficult to machine precisely and necessitating an additional component.

SUMMARY OF THE INVENTION

The object of the present invention is accordingly a piston-rod scraping ring and a groove in a dashpot cap improved to the extent that the ring can easily be inserted into the groove and secured there until the overall dashpot is assembled.

The advantages of the present invention are that the ring can be fastened to the cap by simple means and with low expenditure and before the dashpot is finally assembled. Embodiments of the present invention will now be specified with reference to the accompanying drawing, wherein

DESCRIPTION OF THE PREFERRED EMBODIMENTS

Figure 1:
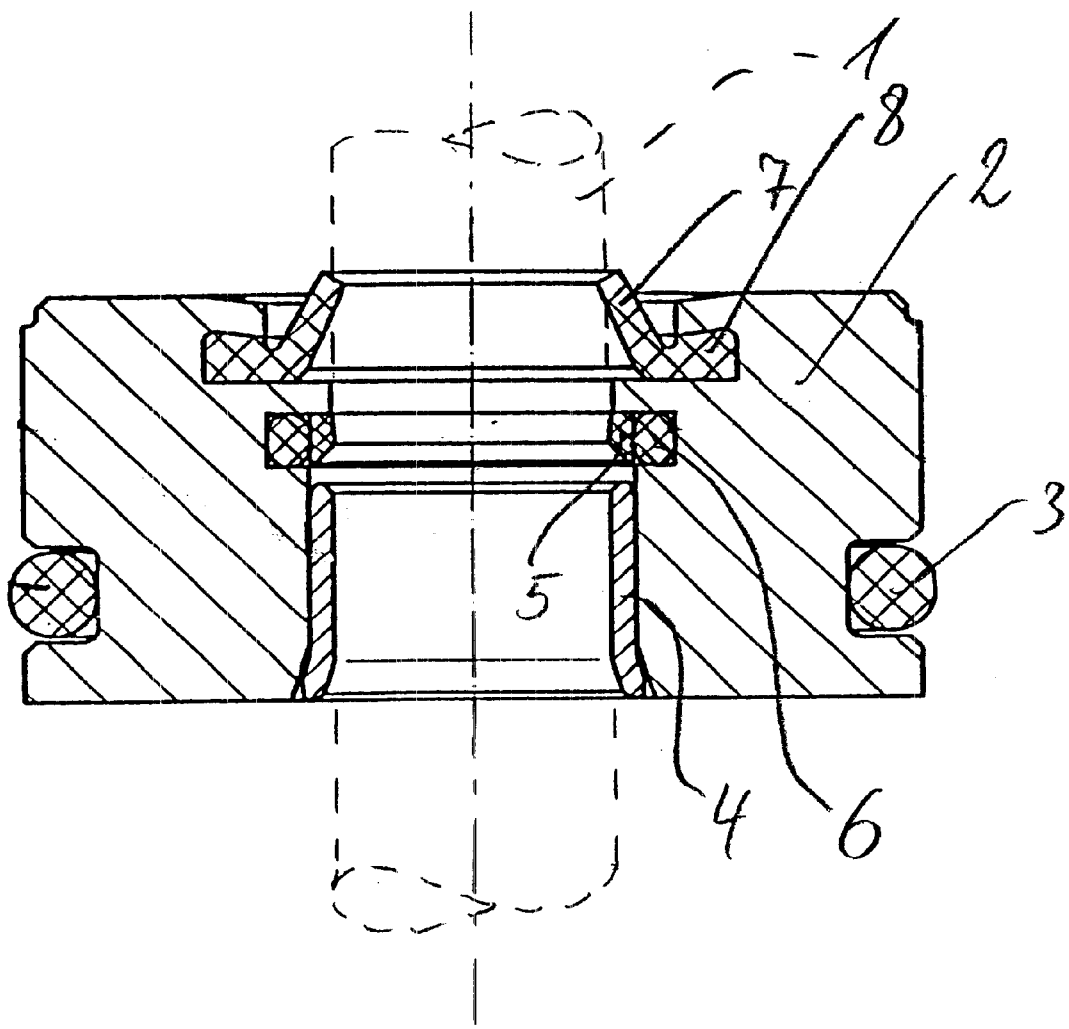
FIG. 1 is a transverse section through the dashpot cap and its associated components.

Piston rods usually extend out of dashpots through caps that close off the dashpots' open ends. FIG. 1 shows such a piston rod 1 and dashpot cap 2. At its outer circumference 2, the cap is sealed off against an unillustrated outer dashpot cylinder by an O ring 3. Such caps can be fastened to the cylinders in various ways.

Cap 2 is provided with various components that center and seal rod 1 as it travels into and out of the cylinder. These components are positioned in the vicinity of a bore that extends through cap 2. Positioned at the bottom of cap 2 is a low-friction bushing 4 that centers rod 1. Above bushing 4, a gasket 5 is accommodated in an inward-opening groove and provided with the requisite radial tension by a compression ring 6.

At the top of cap 2 is a ring 7 that scrapes water and dirt off the section of piston rod 1 outside the cylinder as the rod enters it.

The rim 8 around piston-rod scraping ring 7 is accommodated in an inward opening groove 9 in dashpot cap 2. Prior to assembly of the dashpot, rim 8 is more or less uniformly high. Furthermore, as will be evident from FIG. 2, the height 10 of groove 9 is also more or less uniform.

Figure 2:
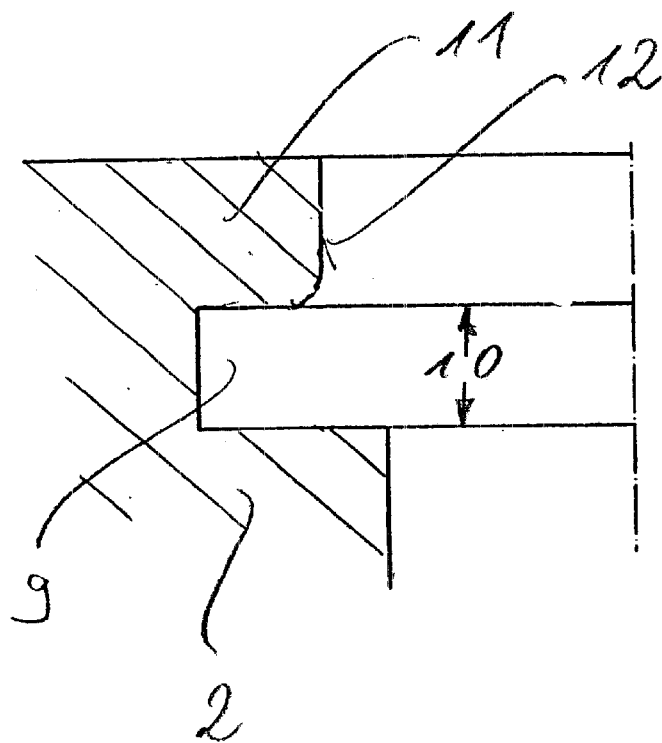
FIG. 2 is a larger-scale depiction, representing the situation before the ring has been secured, of the groove that accommodates the ring.
Figure 3:
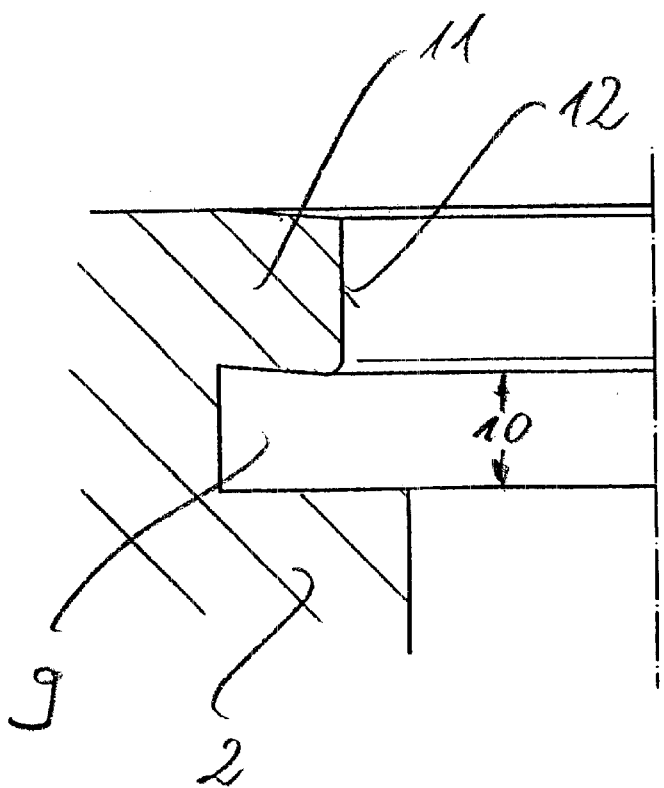
FIG. 3 is an illustration similar to FIG. 2 representing the situation after the ring has been inserted.

The height of the rim 8 around piston-rod scraping ring 7, which is not illustrated in FIG. 2, approximately equals the height 10 of groove 9. Once piston-rod scraping ring 7 has been positioned with its rim 8 in groove 9, the groove's outer wall 11 is forced against its inner circumference 12 by a separate tool, a press for instance, compressing height 10 in the vicinity of the inner circumference.

Figure 4:
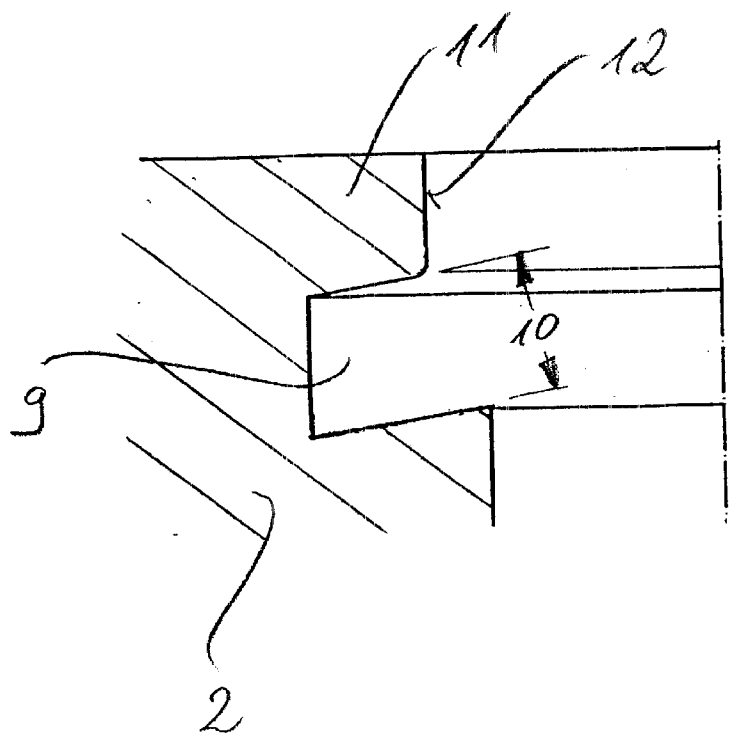
FIG. 4 depicts an alternative embodiment in the situation illustrated in FIG. 2.
Figure 5:
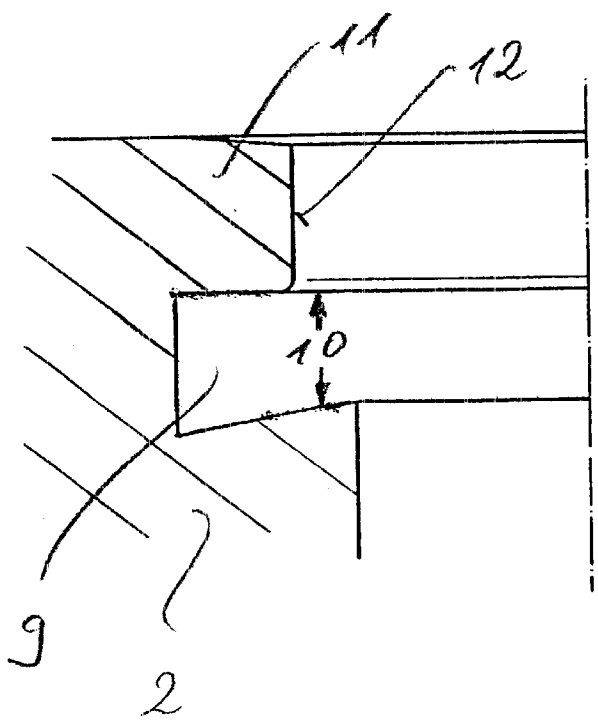
FIG. 5 depicts the same embodiment in the situation illustrated in FIG. 3.

A similar deformation is induced in the embodiment illustrated in FIGS. 4 and 5.

When the conditions wherein piston-rod scraping ring 7 will be employed prescribe that it be forced even more firmly into groove 9, both the groove and the rim 8 around the ring can in their original shape be higher toward the center. When outer wall 11 is deformed such that the height 10 of groove 9 decreases as it approaches inner circumference 12, the rim 8 around the ring will accordingly be more powerfully compressed.

It is also possible for the height of the rim 8 around piston-rod scraping ring 7 to increase outwards, in which event its maximal height will approximately equal the height 10 of groove 9. The seating of piston-rod scraping ring 7 will then be secured, once outer wall 11 has been deformed, by the interlocking structures and by additional axial compression.

List of Parts 1. piston rod
2. dashpot cap
3. O ring
4. bushing
5. gasket
6. compression ring
7. piston-rod scraping ring
8. rim
9. groove
10. height of groove -continued 11. wall
12. inner circumference of groove

What is claimed is:

1. A method of inserting a piston rod scraping ring of elastic material into a groove in a dashpot cap for scraping water and dirt off the piston rod comprising the steps of: providing the ring with a rim around the ring; compressing said rim in vicinity of an inner circumference of said groove, said groove being higher in vicinity of an outer circumference of said groove; inserting said rim into said groove and occupying said groove with said rim; providing said rim with a substantially uniform height equal substantially to the height of said groove; deforming at least a wall of said groove at said inner circumference; and decreasing the height of said groove in vicinity of said inner circumference.

2. A method of inserting a piston rod scraping ring of elastic material into a groove in a dashpot cap for scraping water and dirt off the piston rod comprising the steps of: providing the ring with a rim around the ring; compressing said rim in vicinity of an inner circumference of said groove, said groove being higher in vicinity of an outer circumference of said groove; inserting said rim into said groove and occupying said groove with said rim; providing said rim with a substantially non-uniform height, said groove having a center; decreasing the height of said groove as said center is approached; deforming at least a wall of said groove at said inner circumference; and decreasing the height of said groove in vicinity of said inner circumference.

3. A method of inserting a piston rod scraping ring of elastic material into a groove in a dashpot cap for scraping water and dirt off the piston rod comprising the steps of: providing the ring with a rim around the ring; compressing said rim in vicinity of an inner circumference of said groove, said groove being higher in vicinity of an outer circumference of said groove; inserting said rim into said groove and occupying said groove with said rim; said rim having a center; decreasing the height of said rim as said center is approached; said groove having a substantially original uniform height and a center; decreasing the height of said groove as said center of said groove is approached substantially to the height of said groove; deforming at least a wall of said groove at said inner circumference; and providing said rim with an original maximal height around said ring substantially equal to said original height of said groove.

* * * * *